United States Patent
Takehara

(10) Patent No.: US 10,406,993 B2
(45) Date of Patent: *Sep. 10, 2019

(54) METHOD OF MANUFACTURING VEHICLE

(71) Applicant: Nidec Corporation, Kyoto (JP)

(72) Inventor: Yushi Takehara, Kawasaki (JP)

(73) Assignee: NIDEC CORPORATION, Kyoto (JP)

( * ) Notice: Subject to any disclaimer, the term of this patent is extended or adjusted under 35 U.S.C. 154(b) by 280 days.

This patent is subject to a terminal disclaimer.

(21) Appl. No.: 15/248,149

(22) Filed: Aug. 26, 2016

(65) Prior Publication Data

US 2017/0057422 A1    Mar. 2, 2017

(30) Foreign Application Priority Data

Aug. 27, 2015  (JP) .................................. 2015-168102
Dec. 22, 2015  (JP) .................................. 2015-249840
Jul. 28, 2016  (JP) .................................. 2016-148809

(51) Int. Cl.
*H04N 5/225* (2006.01)
*B60R 11/04* (2006.01)
*B60R 11/00* (2006.01)

(52) U.S. Cl.
CPC ............ *B60R 11/04* (2013.01); *H04N 5/2252* (2013.01); *H04N 5/2257* (2013.01); *B60R 2011/0026* (2013.01); *B60R 2011/0063* (2013.01); *B60R 2011/0071* (2013.01)

(58) Field of Classification Search
CPC .................................................. H04N 5/2252
See application file for complete search history.

(56) References Cited

U.S. PATENT DOCUMENTS

| 2013/0176633 A1* | 7/2013 | Sun ........................ G02B 7/02 359/811 |
| 2014/0160284 A1* | 6/2014 | Achenbach .......... H04N 5/2251 348/143 |
| 2015/0042874 A1 | 2/2015 | Takeda |

FOREIGN PATENT DOCUMENTS

JP      2010-089745 A     4/2010

OTHER PUBLICATIONS

Takeda, N.; "Method of Manufacturing Vehicle-Mounted Camera Housing, Vehicle-Mounted Camera Housing, and Vehicle-Mounted Camera,"; U.S. Appl. No. 14/658,452, filed Mar. 16, 2015.
Takeda, N.; "Vehicle-Mounted Camera, Method of Manufacturing Vehicle-Mounted Camera, and Method of Manufacturing Vehicle Body,"; U.S. Appl. No. 15/067,503, filed Mar. 11, 2016.
Takeda, N.; "Method of Manufacturing Vehicle-Mounted Camera Housing, Vehicle-Mounted Camera Housing, and Vehicle-Mounted Camera,"; U.S. Appl. No. 15/181,626, filed Jun. 14, 2016.

(Continued)

*Primary Examiner* — Md N Haque
(74) *Attorney, Agent, or Firm* — Keating & Bennett, LLP

(57) ABSTRACT

A method of manufacturing a vehicle in which a vehicle-mounted camera is attached to a glass surface on a vehicle interior side of a window glass of a vehicle body, and includes a seat fixed to the glass surface and including a seat surface extending along a predetermined direction and preferably formed by machining, includes determining the predetermined direction on the basis of an inclination angle of the glass surface to set an optical axis direction of the vehicle-mounted camera in any direction. The method of manufacturing provides a vehicle-mounted camera that is low in costs and includes an optical axis with an angle which is easy to adjust.

39 Claims, 10 Drawing Sheets

(56) References Cited

OTHER PUBLICATIONS

Takehara, Y., "Method of Attaching Vehicle-Mounted Camera,"; U.S Appl. No. 15/248,141, filed Aug. 26, 2016.
Onishi, M.; "Vehicle-Mounted Camera and Method of Manufacturing Vehicle-Mounted Camera,"; U.S. Appl. No. 15/248,156, filed Aug. 26, 2016.

* cited by examiner

METHOD OF MANUFACTURING VEHICLE

BACKGROUND OF THE INVENTION

1. Field of the Invention

The present invention relates to a vehicle-mounted camera and more specifically to a method of manufacturing a vehicle including a vehicle-mounted camera.

2. Description of the Related Art

A vehicle-mounted camera that performs image processing of an image captured by a camera attached to a vehicle to extract information regarding a traffic lane, a preceding vehicle, an oncoming vehicle, a person, or a traffic sign from the image has been used. The vehicle-mounted camera is applied to a vehicle-mounted system that supports safe traveling of the vehicle.

In recent years, a variety of sensors such as rain sensor, an illuminance sensor, and a millimeter wave or laser radar sensor have been mounted on vehicles. Therefore, an attachment space for the vehicle-mounted camera is required to be reduced. Further, the vehicle-mounted camera needs to be prevented from hindering driving of a driver, for example, blocking the visual field of the driver or giving an oppressive feeling to the driver. The vehicle-mounted camera is therefore attached along the front window of the vehicle.

When the vehicle-mounted camera is attached to the vehicle, angle adjustment (optical axis adjustment) needs to be performed (see Japanese Patent Application Laid-Open No. 2010-89745). Japanese Patent Application Laid-Open No. 2010-89745 describes an optical-axis adjusting system including a driving means for driving a posture of the vehicle-mounted camera according to operation from the outside and a retaining means for retaining the driving means in a predetermined position.

However, since the vehicle-mounted camera described in Japanese Patent Application Laid-Open No. 2010-89745 includes angle adjusting mechanisms such as the driving means and the retaining means, the number of components increases and the structure of the vehicle-mounted camera is complicated. As a result, an increase in costs of the vehicle-mounted camera is caused. Moreover, the vehicle-mounted camera is increased in size.

SUMMARY OF THE INVENTION

Preferred embodiments of the present invention provide a method of manufacturing a vehicle including a vehicle-mounted camera that is low in costs and includes an optical axis which has an angle which is easy to adjust.

A first preferred embodiment of the present invention provides a method of manufacturing a vehicle including a vehicle-mounted camera including a cover housing including a tabular top plate and a camera main assembly, the vehicle-mounted camera being attached to a glass surface on a vehicle interior side of a window glass in a posture in which the top plate extends along the window glass facing forward or rearward of a vehicle body, and being configured to capture an image of a scene of a vehicle exterior, the method including preparing a set of dies including a pair of or three or more partial dies that obtain, when combined, an internal cavity including a tabular portion sandwiched by a pair of internal surfaces; injecting a material in a flow state into the internal cavity in a state in which the partial dies are combined; solidifying the material; separating the partial dies in the combined state and extracting an intermediate member; applying machining to the intermediate member to obtain the cover housing; fixing the camera main assembly to the inner side of the cover housing; attaching the cover housing attached with the camera main assembly to the window glass; and performing direction adjustment processing on the camera main assembly, wherein the camera main assembly includes a lens assembly, the cover housing includes a seat, a pair of inner surfaces of the die sandwiching the tabular portion in the internal cavity are respectively surfaces of the different partial dies, one of the pair of inner surfaces includes a first surface and the other includes a second surface opposed to the first surface in the vertical direction, the intermediate member includes an intermediate seat portion made of the material solidified between the first surface and the second surface, the distance in the vertical direction between the first surface and the second surface is larger than a vertical dimension of the seat, in the machining, at least a portion of the intermediate seat portion is cut to form the seat, when the seat is formed in the machining, a seat surface that is a surface along a predetermined direction and to be fixed to the glass surface is formed, the predetermined direction is determined with reference to an inclination angle of the glass surface of a target vehicle body, a difference between a direction of the glass surface and a direction of the seat surface, and a direction of an optical axis of the camera main assembly, the vehicle-mounted camera includes a board connected to the camera main assembly and accommodated in the housing and a processing circuit mounted on the board and capable of executing, by electronically processing an image captured by the camera main assembly, at least attachment direction detection processing and direction calculation processing, in the direction adjustment processing, the attachment direction detection processing and the direction calculation processing are executed, in the attachment direction detection processing, in a state in which the vehicle-mounted camera is attached to the glass surface, a target object image of a target object used in direction detection located in a known direction when viewed from the vehicle body is acquired through image-capturing by the camera main assembly, a position of the target object used in direction detection on the target object image is detected, an attachment direction deviation of the camera main assembly calculated using the known direction and the position of the target object used in direction detection is retained in the processing circuit, and, in the direction calculation processing, from a position on an image of an object captured by the camera main assembly, a direction in which the object is located when viewed from the vehicle body is calculated using both of the known direction and the position of the target object used in the direction detection or the attachment direction deviation.

With the various preferred embodiments of the present invention, it is possible to provide a method of manufacturing a vehicle having a vehicle-mounted camera that is low in costs and easy in angle adjustment of an optical axis.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Methods of manufacturing vehicles according to preferred embodiments of the present invention will be described with reference to the drawings.

In the following explanation of the method of manufacturing and attaching the vehicle-mounted camera 100, the vehicle width direction of a vehicle body 1 at the time when the vehicle-mounted camera 100 is attached to the vehicle body 1 is defined as the width direction or left-right direction of the vehicle-mounted camera 100, the front-back direction of the vehicle body 1 is defined as the front-back direction of the vehicle-mounted camera 100, and the vertical direction of the vehicle body 1 is defined as the vertical direction of the vehicle-mounted camera 100. Note that the postures and the layout of members of the vehicle-mounted camera 100 are illustrative only and can be modified without departing from the spirit of the present invention.

Figure 1:
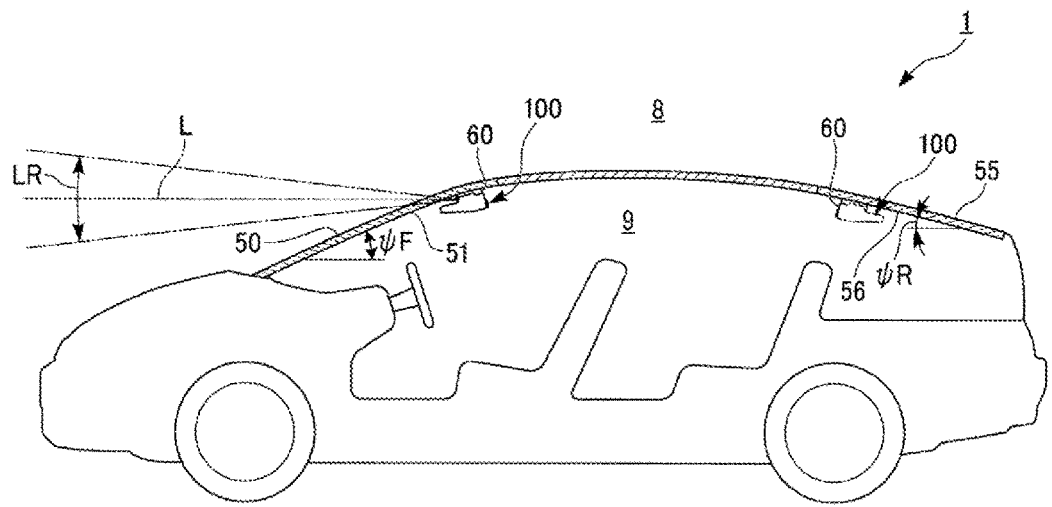
FIG. 1 is a sectional schematic view of a vehicle body according to a preferred embodiment of the present invention.

FIG. 1 is a sectional schematic view of the vehicle body 1 mounted with the vehicle-mounted camera 100. In this specification, the vehicle attached the vehicle-mounted camera 100 is called the vehicle body 1 as a whole.

The vehicle body 1 preferably includes a window glass 50 facing forward (hereinafter, front window) and a window glass 55 facing rearward (hereinafter, rear window). The vehicle-mounted camera 100 is attached to a glass surface 51 on a vehicle interior 9 side of the front window 50 via an attachment member 60 and used to capture an image of a scene ahead of a vehicle exterior 8.

Note that, as indicated by an alternate long and two short dashes line in FIG. 1, the vehicle-mounted camera 100 may be attached to a glass surface 56 on the vehicle interior 9 side of the rear window 55 via the attachment member 60. When the vehicle-mounted camera 100 is attached to the rear window 55, the vehicle-mounted camera 100 is used to capture an image of a scene behind the vehicle exterior 8.

Figure 2:
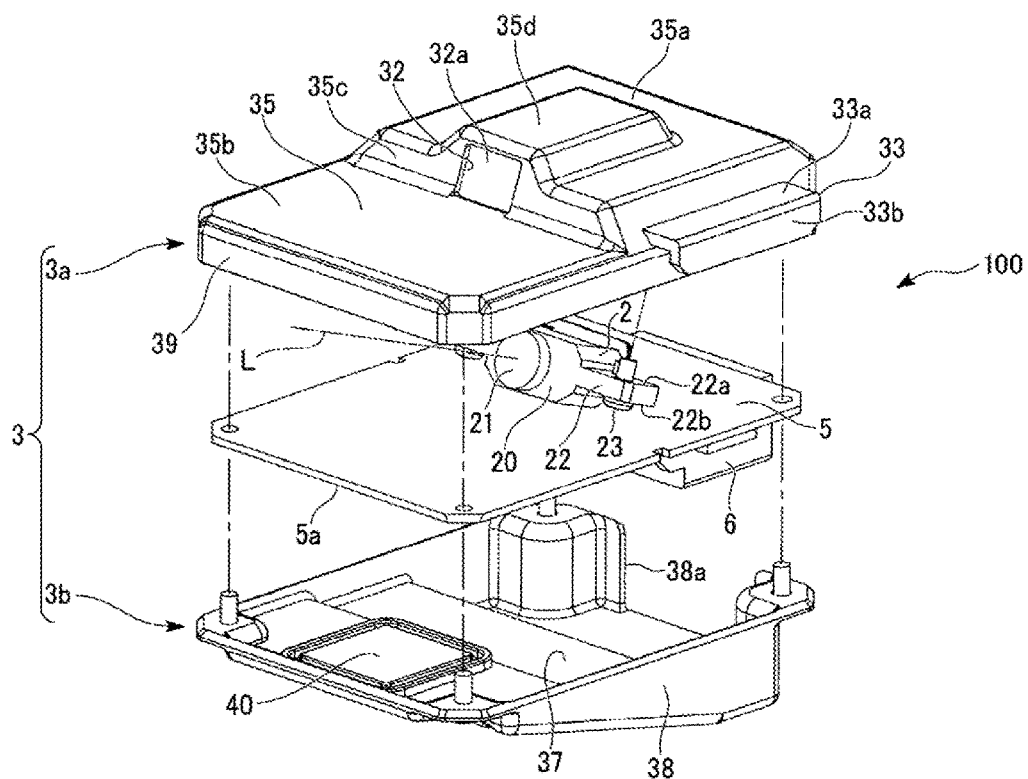
FIG. 2 is an exploded perspective view of a vehicle-mounted camera according to a preferred embodiment of the present invention.
Figure 3:
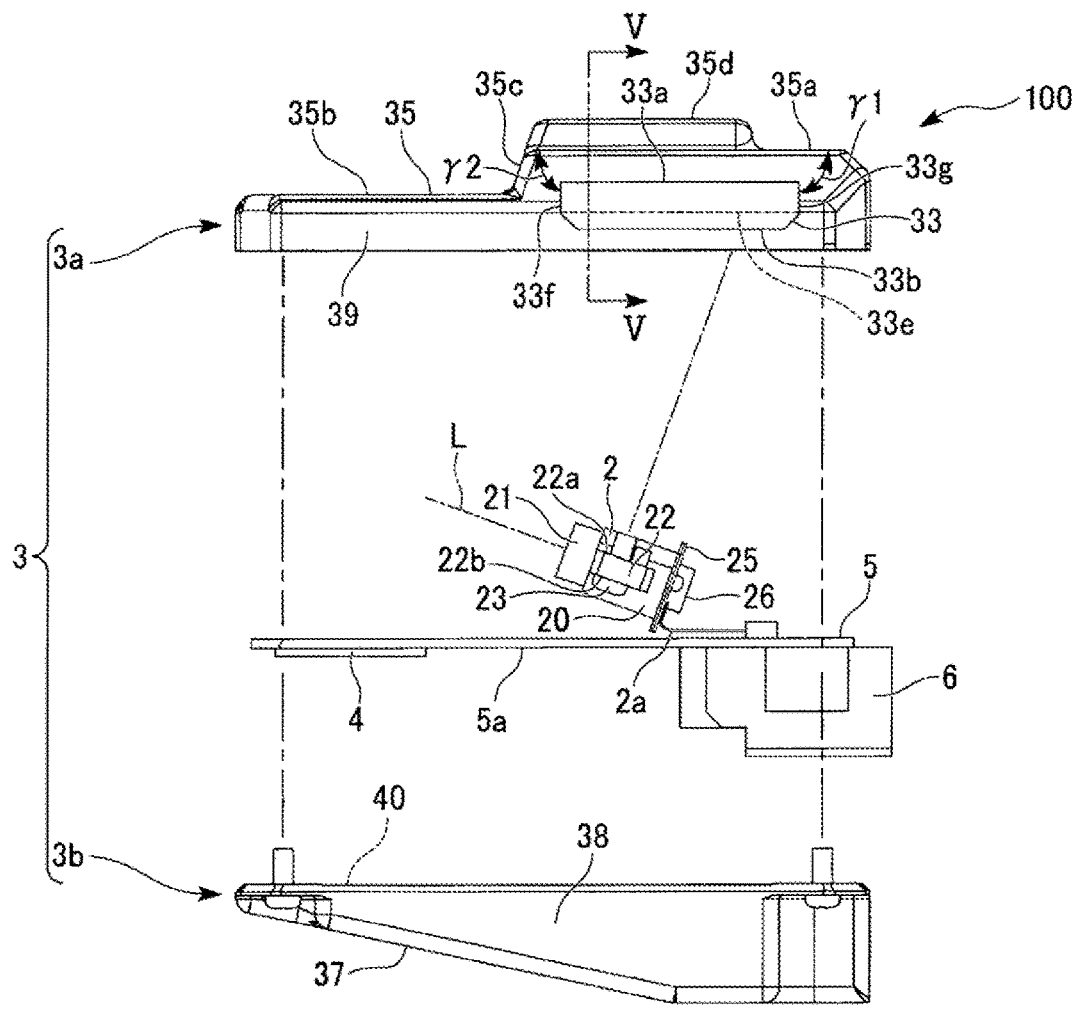
FIG. 3 is an exploded side view of a vehicle-mounted camera according to a preferred embodiment of the present invention.
Figure 4:
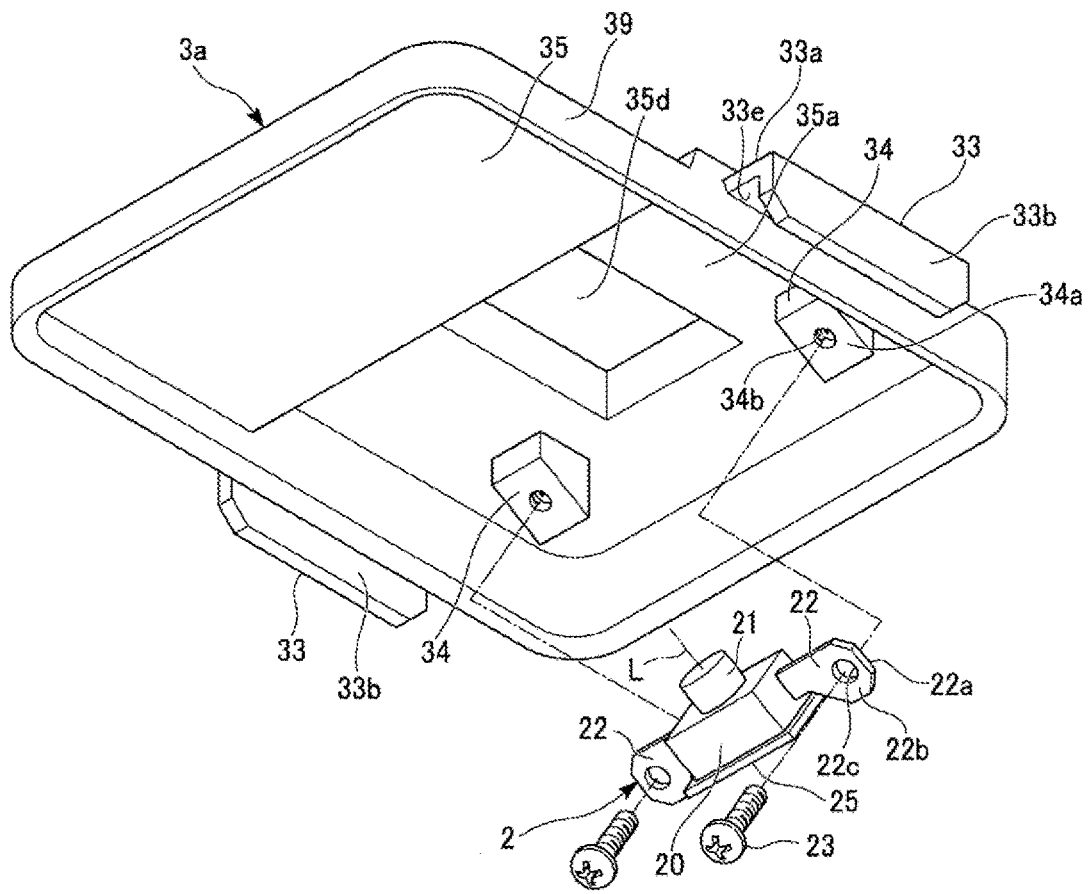
FIG. 4 is an exploded perspective view of a vehicle-mounted camera according to a preferred embodiment of the present invention.

FIGS. 2 to 4 are exploded views of the vehicle-mounted camera 100. Note that, in FIG. 4, illustration of a processing board 5 and a base housing 3b is omitted for simplicity's sake.

As shown in FIGS. 2 and 3, the vehicle-mounted camera 100 preferably includes a housing 3, a camera main assembly 2, and a processing board 5. The housing 3 includes a cover housing 3a and a base housing 3b.

The processing board 5, which includes processing circuitry, a CPU and memory, etc., stores an image and a video captured by the camera main assembly 2 or transmits the image and the video to other apparatuses. As shown in FIG. 3, a processing circuit element 4, a connector 6, and a power supply circuit element, a capacitor, a microcomputer, an IC, and the like e, all of which are not illustrated in the drawings for the sake of simplicity, are mounted on the processing board 5. The processing board 5 is connected to the camera main assembly 2 via a wire 2a. Examples of modes and wiring of the power supply circuit element, the capacitor, the microcomputer, and the IC are described in U.S. Patent Application Publication No. 2016/0091602, filed Sep. 23, 2015; U.S. Patent Application Publication No. 2015/0042798, filed Aug. 8, 2013; and U.S. Patent Application Publication No. 2015/0042874, filed May 5, 2014, which are hereby all incorporated herein by reference in their entireties.

The processing circuit element 4 electronically processes an image captured by an image sensor 26 of the camera main assembly 2. The processing circuit element 4 is provided in a front portion of a lower surface 5a of the processing board 5. The processing circuit element 4 performs processing of extracting various characteristic objects such as a vehicle, a pedestrian, and a traffic lane concerning visual information focused on the image sensor 26. The processing circuit element 4 is preferably in contact with the base housing 3b via a heat radiation member 40. Examples of the heat radiation member 40 include a heat radiation plate or sheet, and a heat radiation gel. As the material of the heat radiation plate and the heat radiation gel, a silicon-based material or the like is preferably used. The processing circuit element 4 generates heat when the vehicle-mounted camera 100 is driven. Since the processing circuit element 4 is in contact with the base housing 3b via the heat radiation member 40, heat radiation performance of the vehicle-mounted camera 100 is improved.

A wire extending to a not-shown external apparatus is connected to the connector 6. The connector 6 is provided in a rear portion of the lower surface 5a of the processing board 5. The connector 6 relays power supply and communication to the vehicle-mounted camera 100.

In various preferred embodiments of the present invention, another processing board can also be used instead of the processing board 5 if so desired. The examples of the processing board are described in U.S. Patent Application Publication No. 2015/0042798, filed Aug. 8, 2013; U.S. Patent Application Publication No. 2015/0042874, filed May 5, 2014; and Japanese Patent Application No. 2015-254737, filed December 25, which are hereby all incorporated herein by reference in their entireties.

The housing 3 preferably houses the processing board 5 and mounted components on the processing board 5 and the camera main assembly 2.

The housing 3 includes the cover housing 3a that supports the camera main assembly 2 and the base housing 3b attached on the lower side of the cover housing 3a that supports the processing board 5. Note that the housing 3 may alternatively not include the base housing 3b if so desired. If the housing 3 does not include the base housing 3b, the processing board 5 is fixed to the lower surface of the cover housing 3a.

As shown in FIG. 2, the cover housing 3a preferably includes a tabular top plate 35, a peripheral edge portion 39 extending to the lower side from the peripheral edge of the top plate 35, and a pair of attachment protrusions 33. The cover housing 3a is preferably fixed to the base housing 3b by, for example, screws in the peripheral edge portion 39. Note that the cover housing 3a may also not include the peripheral edge portion 39 as long as the cover housing 3a includes the top plate 35.

The top plate 35 preferably includes a top plate front portion 35b, a top plate rear portion 35a, and a riser 35c. The top plate front portion 35b is located in a front region in the top plate 35. The top plate rear portion 35a is located in a rear region of the top plate front portion 35b. The top plate rear portion 35a is located above the top plate front portion 35b. The riser 35c is disposed in the boundary between the top plate rear portion 35a and the top plate front portion 35b.

A camera housing portion 35d is provided in the width direction center of the top plate rear portion 35a. The camera housing portion 35d has a shape projecting above the top plate rear portion 35a. The camera main assembly 2 is accommodated in a space below the camera housing portion 35d.

In the riser 35c, a viewing window 32 is preferably provided in a portion located in the front of the camera housing portion 35d. The viewing window 32 is an opening through which an optical axis L of the camera main assembly 2 passes. The camera main assembly 2 captures an image on the outside of the vehicle through the viewing window 32. The viewing window 32 is closed by a transparent plate 32a that preferably prevents ingress of dust into the inner side of the housing 3.

As shown in FIG. 4, the attachment protrusions 33 are respectively provided on width direction both sides of the peripheral edge portion 39 of the cover housing 3a. The attachment protrusions 33 are used to attach the vehicle-mounted camera 100 to the vehicle body 1 described below. The attachment protrusions 33 extend in the front-back direction in a uniform sectional shape. The attachment protrusions 33 include width-direction projecting portions (the seats) 33a projecting toward the width direction outer side and downward projections 33b projecting downward from the distal ends of the width-direction projecting portions 33a. The width-direction projecting portion 33a functions as a seat. That is, the cover housing 3a includes the width-direction projecting portion (the seat) 33a. On the lower side of the width-direction projecting portion 33a, a seat surface 33e mounted on a mounting surface 64a (see FIG. 9) of the attachment member 60 is provided. The seat surface 33e is a surface machined to face a predetermined direction.

As shown in FIG. 3, of side surfaces in the front and the back of the width-direction projecting portion 33a, the side surface on the opposite side of an image-capturing direction of the camera main assembly 2 is represented as a rear end surface (a rearward end surface) 33g and the side surface on the image-capturing direction side of the camera main assembly 2 is represented as a front end surface (a forward end surface) 33f. A first angle γ1 formed by the rear end surface 33g and the top plate 35 is preferably larger than 90°. A second angle γ2 formed by the forward end surface 33f and the top plate 35 is preferably larger than 90°. That is, the width-direction projecting portion 33a has a width that narrows in the front-back direction toward the lower side. Consequently, when the cover housing 3a is molded by the die, it is possible to provide a draft with respect to a draft direction of the die located on the lower side. It is possible to smoothly perform the molding.

A method of manufacturing the cover housing 3a will be described.

The cover housing 3a is preferably manufactured through a molding process, a surface treatment process, and a machining process.

First, the molding process in a manufacturing process for the cover housing 3a will be described.

In the molding process, an intermediate member having an external shape substantially the same as the external shape of the cover housing 3a is manufactured using a die. In the following explanation, it is assumed that aluminum or an aluminum alloy is selected as the material of the cover housing 3a. However, it should be noted that it is possible to use any other desirable material to produce the cover housing. The intermediate member is molded by a die cast method. Note that any molding apparatus may be used as long as die molding is performed using the die. For example, when a resin material is selected as the material of the cover housing 3a, the molding process is a process of resin molding performed using the die.

Note that, as the aluminum alloy used as the material of the cover housing 3a, for example, any material standardized as an aluminum alloy for forging by the Aluminum Association can be used. When the resin material is adopted as the material of the cover housing 3a, any desirable resin material publicly-known in the past such as, for example, polystyrene resin can be used.

Figure 5:
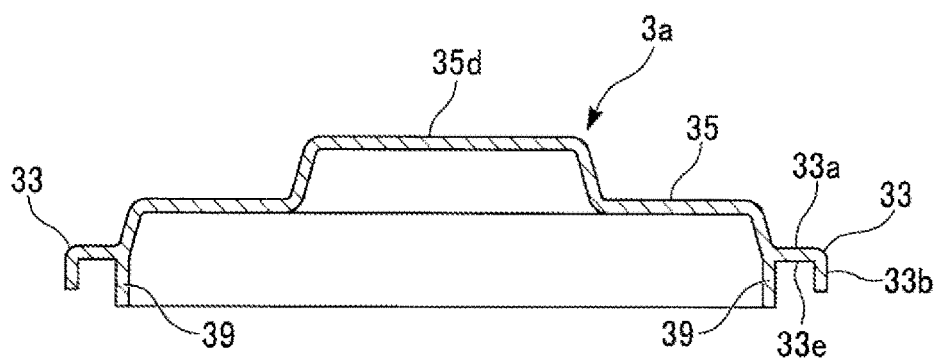
FIG. 5 shows a cover housing according to a preferred embodiment and is a sectional view taken along line V-V shown in FIG. 3.
Figure 6:
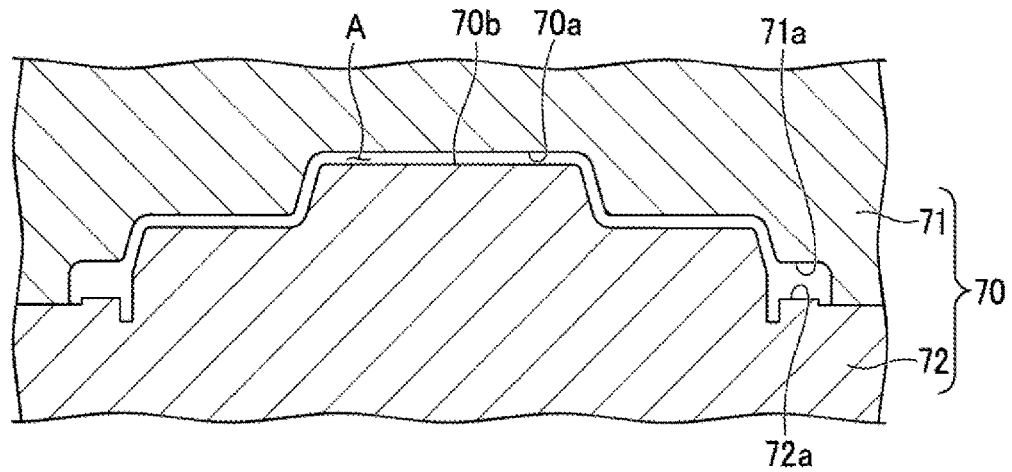
FIG. 6 is a sectional view of a die to mold the cover housing according to a preferred embodiment of the present invention.
Figure 7:
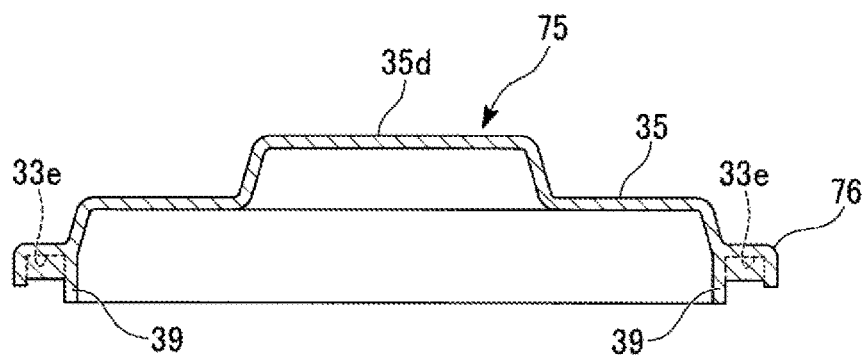
FIG. 7 is a sectional view of an intermediate member according to a preferred embodiment of the present invention.

FIG. 5 is a sectional view of the cover housing 3a taken along line V-V shown in FIG. 3. FIG. 6 is a diagram showing a die configuration in the molding process. FIG. 7 is a sectional view of an intermediate member 75 molded by the molding process.

In the molding process, first, a die 70 shown in FIG. 6 is prepared. The die 70 includes a pair of partial dies (a first partial die 71 and a second partial die 72). The first partial die 71 molds an upper surface side of the cover housing 3a and the second partial die 72 molds a lower surface side of the cover housing 3a. The lower side of the first partial die 71 and the second partial die 72 respectively configure inner surfaces 70a and 70b of the die 70. The die 70 includes a tabular portion sandwiched by the pair of inner surfaces 70a and 70b and obtains an inner cavity A used to mold the tabular intermediate member 75. Note that the die 70 may be configured from three or more partial dies.

Subsequently, in a state in which the partial dies 71 and 72 are combined, the material (the aluminum alloy) in a flow state is injected into the internal cavity A while pressure is applied to the material.

Subsequently, the material in the die 70 is cooled for a fixed time to solidify (coagulate) the material.

Subsequently, the partial dies 71 and 72 in the combined state are separated. Consequently, the intermediate member 75 having a shape same as the shape of the internal cavity A between the partial dies 71 and 72 is extracted.

The internal cavity A sandwiched by the pair of inner surfaces 70a and 70b of the die 70 includes a tabular portion. Therefore, the intermediate member 75 molded by injecting the material into the internal cavity A and solidifying the material has a tabular shape. The pair of inner surfaces 70a and 70b of the die, which sandwiches the tabular portion in the internal cavity A, is respectively surfaces of the different partial dies 71 and 72. Therefore, in the intermediate member 75, one surface and the other surface of the tabular portion are respectively molded by the different partial dies 71 and 72.

The intermediate member 75 preferably includes the top plate 35 including the camera housing portion 35d and the peripheral edge portion 39 extending to the lower side from the peripheral edge of the top plate 35. The intermediate member 75 includes a pair of intermediate seat portions 76 respectively projecting in the width direction from width direction both sides of the peripheral edge portion 39. The intermediate seat portions 76 are elements corresponding to the width-direction projecting portion (seat) 33a of the cover housing 3a.

The first partial die 71 includes, as a portion of the inner surface 70a, a first surface 71a to mold the upper surface of the intermediate seat portion 76. Similarly, the second partial die 72 includes, as part of the inner surface 70b, a second surface 72a to mold the lower surface of the intermediate seat portion 76. The first surface 71a and the second surface 72a are opposed to each other in the vertical direction. The intermediate seat portion 76 is made of a material solidified between the first surface 71a and the second surface 72a. The distance in the vertical direction between the first surface 71a and the second surface 72a is larger than a vertical dimension of the width-direction projecting portion 33a of the cover housing 3a. Therefore, the vertical dimension of the intermediate seat portion 76 is larger than the vertical dimension of the width-direction projecting portion 33a of the cover housing 3a.

Subsequently, the surface treatment process in the manufacturing process for the cover housing 3a will be described.

In the surface treatment process, painting or surface treatment of black alumite or the like is preferably applied to at least a portion of the surface of the intermediate member 75 to form a surface film. Consequently, it is possible to improve anticorrosion and abrasion resistance of the cover housing 3a. In addition, it is possible to color an inner side portion of the cover housing 3a in black, prevent irregular reflection of the sunlight on the inside of the cover housing 3a, and perform highly accurate imaging.

Note that the surface treatment process may be omitted.

The machining process in the manufacturing process of the cover housing 3a will now be described.

In the machining process, machining (cutting) is applied to a portion of the intermediate seat portion 76 of the intermediate member 75 to form the seat surface 33e and obtain the cover housing 3a.

Figure 8:
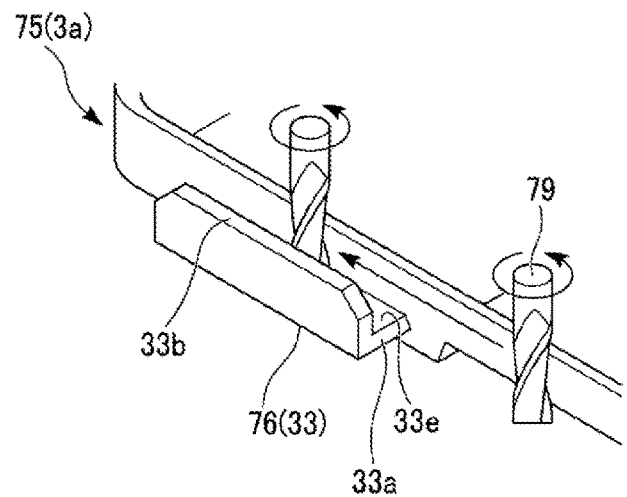
FIG. 8 is a perspective view showing machining in a manufacturing process for the cover housing according to a preferred embodiment of the present invention.

FIG. 8 is a perspective view schematically showing the machining process. Note that, in FIG. 8, the intermediate member 75 (the cover housing 3a) is shown in a vertically reversed state.

In the machining, a machining tool 79 is caused to pass along the front-back direction on a surface on the lower side of the intermediate seat portion 76 of the intermediate member 75 (a surface facing the upper side in FIG. 8). As the machining tool 79, for example, an end mill can preferably be used. The surface on the lower side of the intermediate seat portion 76 is cut by the machining tool 79 to form the attachment protrusion 33 of the cover housing 3a. Note that the seat surface 33e formed as the lower surface of the attachment protrusion 33 is a surface extending along a predetermined direction (a positioning direction D33, see FIG. 12) described below. Therefore, the seat surface 33e is formed by causing the machining tool 79 to pass along the positioning direction D33. The positioning direction D33 (D33A, D33B, and D33C) of the seat surface 33e is selected according to an inclination angle of the glass surface 51 of the vehicle body 1 to which the vehicle-mounted camera 100 is attached. That is, a tool path, through which the machining tool 79 passes, is selected according to the inclination angle of the glass surface 51.

The positioning direction D33 of the seat surface 33e is determined with reference to the dimensions of the attachment member 60, the cover housing 3a, and the camera main assembly 2, the inclination angle of the glass surface 51, and an image-capturing direction in which the camera main assembly 2 captures an image of a scene and a tolerance allowed for the image-capturing direction. Usually, such reference to the tolerance can be determined by simple calculation including addition and subtraction of angles. Machining of the seat surface 33e is carried out on the basis of the positioning direction D33 determined in advance in this way. Since calculations used in determining a direction are simple, the direction may be calculated immediately before the machining.

With the method of manufacturing the cover housing 3a in accordance with a preferred embodiment of the present invention described above, the machining is carried out after the surface treatment process. Therefore, the surface film on the seat surface 33e is removed in the machining. The seat surface 33e changes to a state in which a metal surface is exposed. Consequently, positioning accuracy of the seat surface 33e mounted on the mounting surface 64a (see FIG. 9) of the attachment member 60 is improved. Therefore, compared with when the positioning is performed on the surface film, the seat surface 33e can highly accurately perform the positioning of the vehicle-mounted camera 100.

The method described above is basically based on the premise that only one kind of die 70 is used. However, a plurality of kinds of dies may be used.

In that case, the shapes of internal spaces of the plurality of dies are set different from one another at least on a surface of the intermediate member 75 in contact with the intermediate seat portion 76. As a result, the intermediate seat portions 76 of the intermediate member 75 obtained from the different dies are different from one another. In this case, if the shapes of the dies are adjusted and inclination angles of the intermediate seat portions 76 are aligned in a positioning direction, it is possible to obtain the intermediate seat portions 76 having an assumed plurality of positioning directions without cutting the intermediate seat portions 76. For example, when four positioning directions are assumed in a design stage, four dies 70 are prepared according to the four positioning directions.

Note that, when a method of selecting a plurality of kinds of dies is selected, the machining may be applied to the intermediate seat portion 76. For example, the surface of the intermediate seat portion 76 may be cut for the purpose of improving the flatness of the intermediate seat portion 76. In this case, it is possible to reduce a necessary cutting amount compared with when the intermediate member 75 is obtained from one kind of die.

The types of dies to be prepared may be fewer than positioning directions to be assumed. For example, when four positioning directions of 20 degrees, 24 degrees, 28 degrees, and degrees are assumed, two kinds of dies 70 are prepared, machining is applied to an intermediate member obtained from one die to obtain a cover housing having the positioning directions of 20 degrees and 24 degrees, and the machining is also applied to an intermediate member obtained from the other die to obtain another kind of cover housing having the positioning directions of 28 degrees and 32 degrees. In this case, an intermediate seat portion of the intermediate member obtained from the one die is set to an angle from which positioning angles of 20 degrees and 24 degrees can be obtained with a relatively small cutting amount. An intermediate seat portion of the intermediate member obtained from the other die is set to an angle from which positioning angles of 28 degrees and 32 degrees can be obtained with a relatively small cutting amount. That is, a plurality of kinds of dies fewer than assumed positioning angles are prepared. Concerning at least one kind among a plurality of kinds of intermediate members to be obtained, a plurality of kinds of cover housings are obtained by the machining. By adopting this method, it is possible to suppress a machine cutting amount while suppressing an increase in types of dies.

As shown in FIGS. 2 and 3, the base housing 3b preferably covers the processing board 5 from the lower side. The height of the base housing 3b gradually decreases from the back to the front. The base housing 3b includes a sidewall portion 38 and a bottom portion 37. The heat radiation member 40 is provided in a front portion of the bottom portion 37 in a position brought into contact with the processing circuit element 4. The sidewall portion 38 extends upward from the peripheral edge of the bottom portion 37. An opening 38a is provided in a rear portion of the sidewall portion 38. Since the opening 38a is provided, the connector 6 mounted on the processing board 5 is exposed from the rear side of the sidewall portion 38. It is possible to connect a wire (not shown in the figure) extending to the external apparatus.

In this preferred embodiment, the cover housing 3a and the base housing 3b are preferably made of, for example, aluminum or an aluminum alloy and are molded by, for example, pressing or a die cast forging method. Since the cover housing 3a and the base housing 3b are made of aluminum or an aluminum alloy, it is possible to increase a heat capacity of the entire housing 3 and transfer heat generated from the processing board 5 to effectively cool the processing board 5.

As shown in FIG. 4, the camera main assembly 2 is fixed to the cover housing 3a in a camera fixing seat 34. Since the cover housing 3a is preferably made of aluminum or an aluminum alloy, it is possible to suppress deformation under an external force and secure attachment accuracy of the camera main assembly 2.

The camera main assembly 2 is a device that captures an image of a scene ahead of the vehicle body 1 as visual information.

As shown in FIG. 3, the camera main assembly 2 has one optical axis L. The camera main assembly 2 preferably includes a base assembly 20, a lens assembly 21, an image sensor board 25, and the image sensor 26.

The lens assembly 21 includes a plurality of lenses, the optical axes of which are aligned, and a barrel having a cylindrical shape that holds the lenses. A common optical axis of the plurality of lenses is the optical axis L of the camera main assembly 2. The lens assembly 21 projects to the front of the base assembly 20 and is fixed to the base assembly 20. The image sensor 26 is disposed behind the lens assembly 21.

The image sensor board 25 is preferably fixed to the rear surface of the base assembly 20. The image sensor 26 is mounted on the image sensor board 25.

The image sensor 26 acquires visual information in an outside world as an image. The image sensor 26 captures an object image focused through the lens assembly 21. As the image sensor 26, for example, a CMOS image sensor is used.

The base assembly 20 is pierced through by the lens assembly 21. The base assembly 20 holds the outer circumference of the lens assembly 21.

As shown in FIG. 4, a pair of camera-side pedestals 22 extending to the outer side is provided on width direction both sides of the base assembly 20.

The camera-side pedestals 22 include camera-side pedestal surfaces 22a, which are surfaces parallel or substantially parallel to the optical axis L. The camera-side pedestals 22 include lower surfaces 22b located on the opposite side of the camera-side pedestal surfaces 22a. In the camera-side pedestals 22, through-holes 22c opened on the camera-side pedestal surfaces 22a and the lower surfaces 22b are provided. Screws 23 are inserted into the through-holes 22c. The screws 23 are screwed in screw holes 34b provided on pedestal camera fixing surfaces 34a. Consequently, the camera main assembly 2 is fixed to the cover housing 3a in a state in which the camera-side pedestal surfaces 22a are in contact with the pedestal camera fixing surfaces 34a of the cover housing 3a.

The camera-side pedestals 22 are portions extending in directions away from the optical axis L of the lens assembly 21. That is, the camera-side pedestals 22 expand toward the outer side from the inner side of an imaginary circle centering on the optical axis L. The camera-side pedestals 22 do not always need to extend toward the radial direction. The camera-side pedestals 22 are preferably disposed away from the optical axis L. Consequently, in a process for fixing the pedestals for camera fixing 34 of the cover housing 3a to the camera-side pedestals 22, it is possible to sufficiently secure the distance between a tool that screws in the screws 23 and the lens assembly 21 and the image sensor 26. Consequently, it is possible to prevent damage to the lens assembly 21 and the image sensor 26 in an assembly process. It is possible to facilitate assembly work.

Attachment of the vehicle-mounted camera 100 to the vehicle body 1 by the attachment member 60 will now be described.

Figure 9:
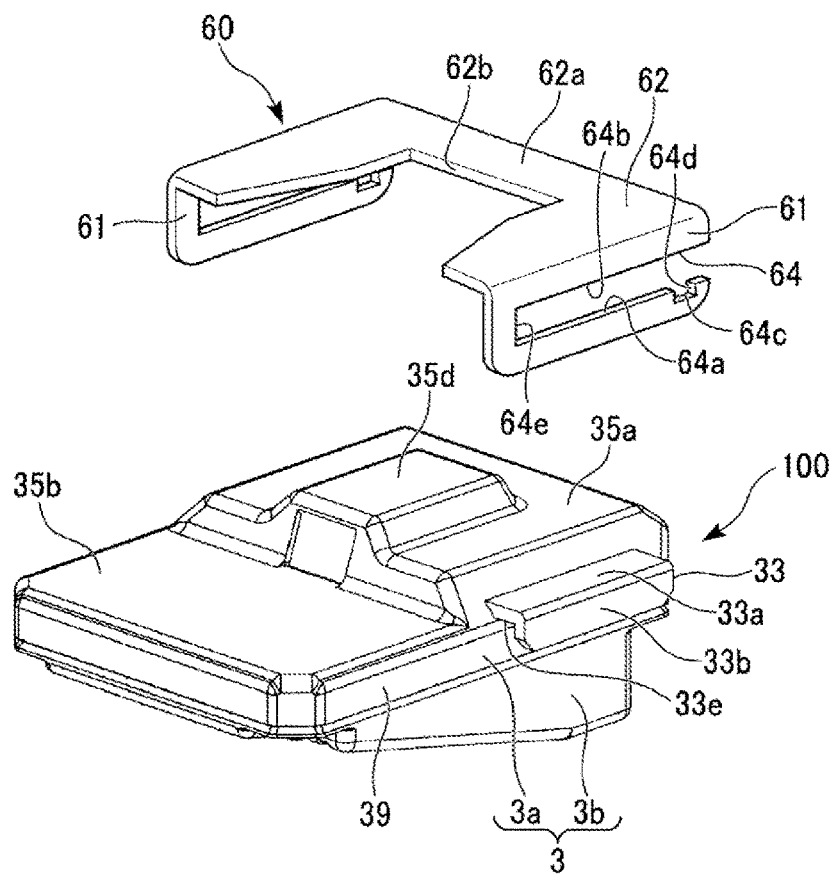
FIG. 9 is a perspective view of the vehicle-mounted camera and an attachment member according to a preferred embodiment of the present invention.
Figure 10:
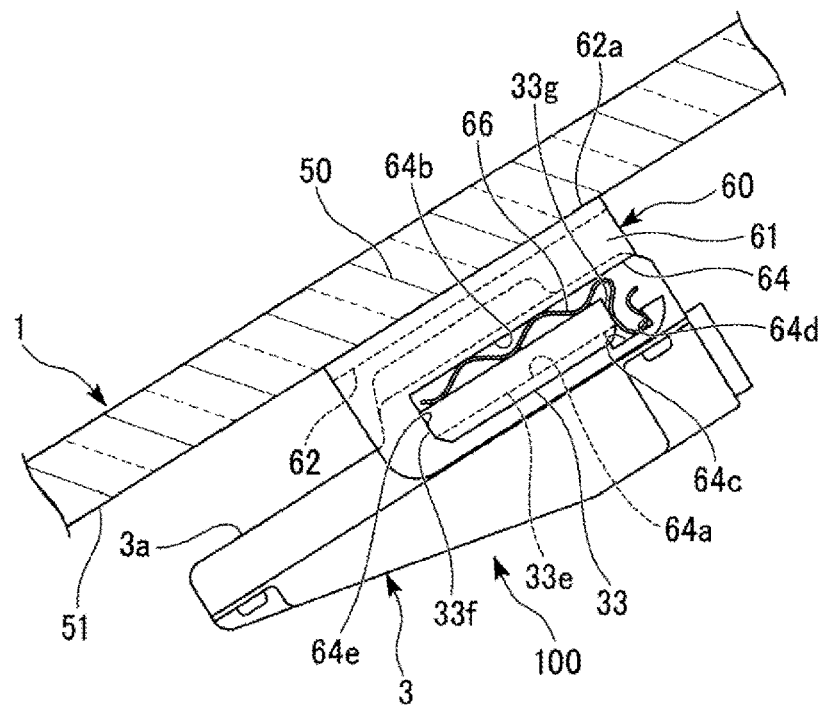
FIG. 10 is a side view of a vehicle-mounted camera and the attachment member according to a preferred embodiment of the present invention and shows a state in which the vehicle-mounted camera is attached to the front window.

FIG. 9 is a perspective view of the vehicle-mounted camera 100 supported by the attachment member 60. FIG. 10 is a side view of the vehicle-mounted camera 100 showing a state in which the vehicle-mounted camera 100 is attached to the vehicle body 1 via the attachment member 60.

The attachment member 60 is preferably fixed to the glass surface 51 of the front window 50 and supports the cover housing 3a of the vehicle-mounted camera 100.

The attachment member 60 is fixed to a predetermined position of the front window 50, for example, the glass surface 51 near a rear-view mirror. The attachment member 60 preferably supports the vehicle-mounted camera 100 such that the top plate 35 of the cover housing 3a takes a posture extending along the front window 50 of the vehicle body 1. Since the vehicle-mounted camera 100 is attached along the glass surface 51, the vehicle-mounted camera 100 does not block the forward visual field of the driver.

As shown in FIG. 10, the attachment member 60 preferably includes a glass surface fixing portion 62 having a flat shape and a pair of housing fixing portions 61 extending downward from width direction both end portions of the glass surface fixing portion 62. The attachment member 60 is fixed to the glass surface 51 in the glass surface fixing portion 62 and fixed to the cover housing 3a in the pair of housing fixing portions 61.

As shown in FIG. 9, a cutout portion 62b extending rearward from the front side is provided in the glass surface fixing portion 62 of the attachment member 60. The cutout portion 62b is provided in a position overlapping the camera housing portion 35d of the cover housing 3a in plan view. In a state in which the vehicle-mounted camera 100 is supported by the attachment member 60, the glass surface fixing portion 62 covers, from the upper side, the top plate rear portion 35a excluding the camera housing portion 35d in the top plate 35 of the cover housing 3a.

As shown in FIG. 10, an upper surface 62a of the glass surface fixing portion 62 is in contact with the glass surface 51 via an adhesive to be fixed to the glass surface 51. Note that the upper surface 62a may be fixed to the glass surface 51 via a double sided tape, on both surfaces of which adhesive layers including an adhesive are provided.

As shown in FIG. 9, the housing fixing portions 61 have a tabular shape extending in the front-back direction and the vertical direction. In a state in which the vehicle-mounted camera 100 is fixed to the attachment member 60, the housing fixing portions 61 are located on width direction both sides of the cover housing 3a and cover a portion of the peripheral edge portion 39 of the cover housing 3a. In the housing fixing portions 61, attachment openings 64 piercing through the housing fixing portions 61 in the width direction are provided. The attachment openings 64 are preferably cutout-shaped slits extending in the front-back direction and opened rearward.

The attachment openings 64 include the mounting surfaces 64a facing the upper side and upper side surfaces 64b facing the lower side. The mounting surfaces 64a and the upper side surfaces 64b are vertically opposed to each other. Concave portions 64c recessed toward the lower side are preferably provided on the rear side on mounting surfaces 64a. As shown in FIG. 10, the attachment protrusions 33 of the cover housing 3a are inserted into the attachment openings 64 from the back to the front. Consequently, the attachment protrusions 33 are mounted on the mounting surfaces 64a. Wavy leaf springs 66 are held between the upper side surfaces 64b and the attachment protrusions 33 in the vertical direction. The leaf springs 66 press the attachment protrusions 33 against the mounting surfaces 64a and stabilize the contact of the attachment protrusions 33 and the mounting surfaces 64a. The leaf springs 66 extend to the rear side and are disposed between rear end surfaces 33g of the attachment protrusions 33 and surfaces 64d facing the front of the concave portions 64c. The leaf springs 66 press the attachment protrusions 33 forward and set front end surfaces 33f of the attachment protrusions 33 in contact with surfaces 64e facing rearward of the attachment openings 64. Consequently, the leaf springs 66 prevent the vehicle-mounted camera 100 from moving in the front-back direction with respect to the attachment member 60.

Figure 11:
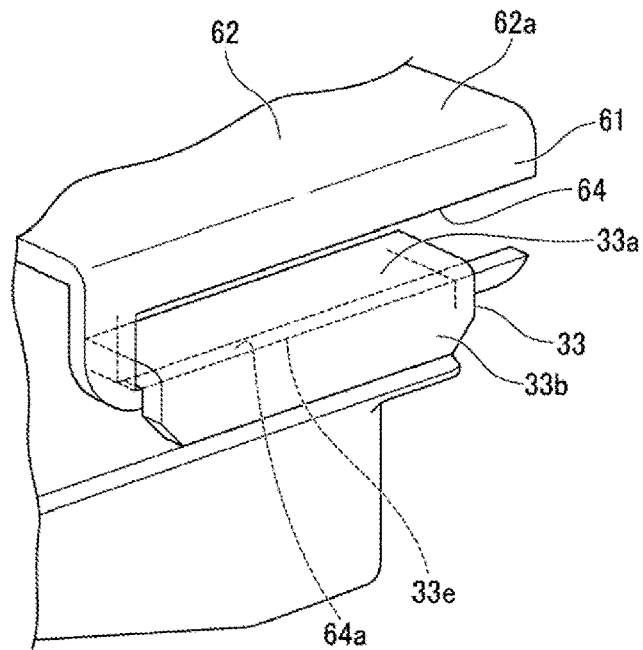
FIG. 11 is an enlarged perspective view of an attachment protrusion that fits in an attachment opening according to a preferred embodiment of the present invention.

FIG. 11 is an enlarged perspective view of the attachment protrusion 33 fit in the attachment opening 64. Note that, FIG. 11 and the subsequent figures, illustration of the leaf spring 66 and the concave 64c of the attachment opening 64 is omitted for the sake of simplicity. As shown in FIG. 11, the cover housing 3a is preferably supported by the housing fixing portion 61 in a state in which a pedestal surface 33e of the width-direction projecting portion 33a is in contact with the mounting surface 64a. The downward projection 33b of the attachment protrusion 33 is located on a width direction outer side of the housing fixing portion 61 and prevents the attachment protrusion 33 from slipping off from the attachment opening 64 of the housing fixing portion 61. Further, the downward projection 33b prevents movement to the width direction inner side of the cover housing 3a with respect to the housing fixing portion 61. Since the downward projections 33b are respectively provided on the width direction both sides of the cover housing 3a, the downward projections 33b prevents movement to the width direction inner side of the cover housing 3a on the width direction both sides. Consequently, the cover housing 3a is stably supported by the housing fixing portion 61. Note that the width direction inner side surfaces of the pair of housing fixing portions 61 may be set slightly smaller than a width direction dimension of the peripheral edge portion 39 of the cover housing 3a. The cover housing 3a may be supported in a state in which the peripheral edge portion 39 is pressurized by the pair of housing fixing portions 61. The vehicle-mounted camera 100 is preferably prevented from moving in the left-right direction with respect to the attachment member 60 by this structure. Further, the width direction inner side surfaces of the pair of downward projections 33b may be set slightly smaller than the width direction dimension of the peripheral edge portion 39 of the cover housing 3a. The cover housing 3a may be pinched and supported by the pair of downward projections 33b. In this case, the attachment member 60 can support the vehicle-mounted camera 100 without being affected by vibration.

As shown in FIG. 1, the glass surface 51 of the front window 50 of the vehicle body 1 tilts at an inclination angle $\Psi F$. Each car model of the vehicle body 1 has a different inclination angle $\Psi F$. A method of manufacturing and attaching the vehicle-mounted camera 100 to the vehicle body 1 having various inclination angles $\Psi F$ with the optical axis L of the camera main assembly 2 set to a preferable angle will now be described. The method of manufacturing and attaching the vehicle-mounted camera 100 described herein includes calibration of the vehicle-mounted camera 100 performed when the vehicle-mounted camera 100 is attached to the vehicle body 1.

Note that, when the vehicle-mounted camera 100 is attached to the glass surface 56 of the rear window 55, according to a method same as the method described above, the optical axis L of the camera main assembly 2 is set to a preferable angle with respect to an inclination angle $\Psi R$ of the glass surface 56 that is different for each of the car models.

In general, the front window 50 curves from the center toward the width direction. In this preferred embodiment of the present invention, the curve of the front window 50 is neglected assuming that the vehicle-mounted camera 100 is attached to the width direction center of the front window 50. Note that, when the vehicle-mounted camera 100 is preferably attached to a position deviating to a width direction one side of the front window 50, the optical axis L tilts in the left-right direction. In this case, the tilt in the left-right direction is able to be corrected by image processing in the processing circuit element 4.

As shown in FIG. 1, the vehicle-mounted camera 100 is attached to the vehicle body 1 such that the optical axis L fit within a tolerable direction range LR having a predetermined angle width. When the optical axis L is outside the tolerable direction range LR, the vehicle-mounted camera 100 cannot sufficiently secure the visual field of the camera main assembly 2 and cannot sufficiently obtain information necessary for vehicle body control. The tolerable direction range LR is set in advance on the basis of the horizontal direction.

Unless specifically described otherwise in the following explanation, as the direction of the optical axis L, the horizontal direction included in the tolerable direction range LR is selected.

Figure 12:
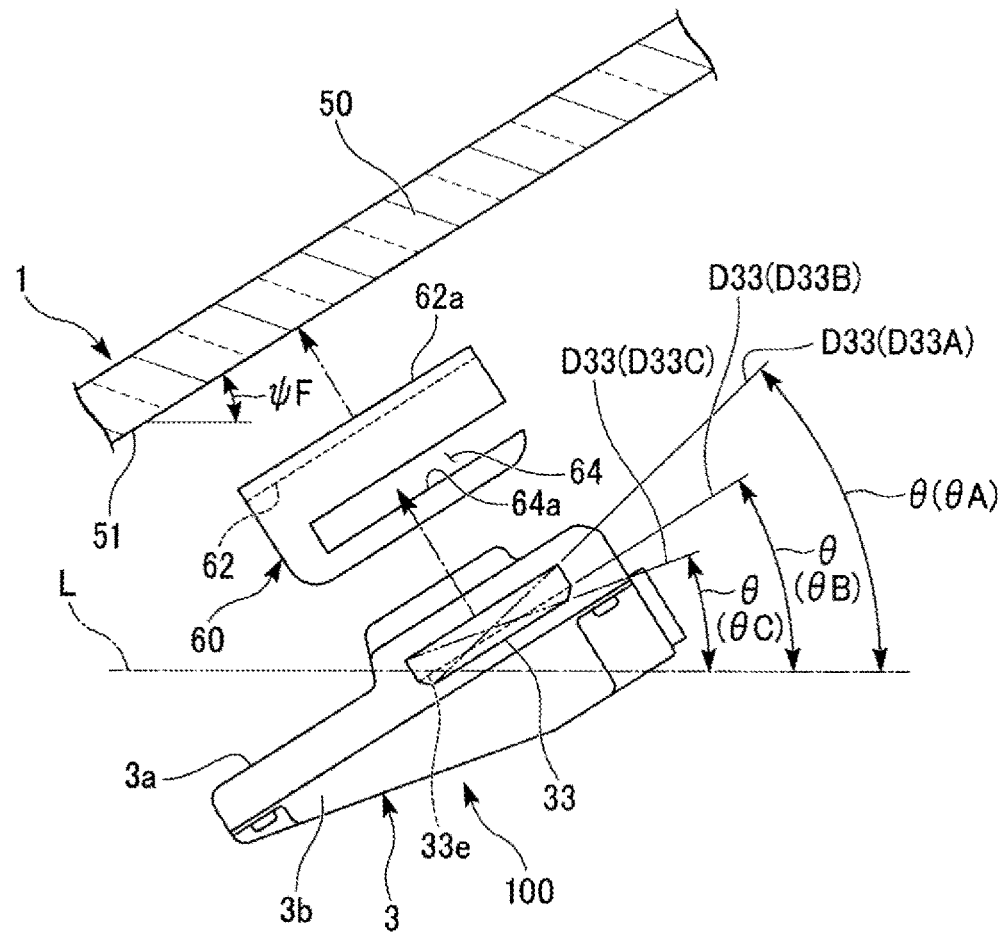
FIG. 12 is a side view of the vehicle-mounted camera and the attachment member according to a preferred embodiment of the present invention and shows a procedure for attaching the vehicle-mounted camera to a vehicle body.

FIG. 12 is a side view of the vehicle-mounted camera 100 and the attachment member 60 showing a procedure for attaching the vehicle-mounted camera 100 to the vehicle body 1 via the attachment member 60. Note that, in FIG. 12, illustration of concave portions 64c (see FIG. 10) provided in attachment openings 64 of the attachment member 60 is omitted.

First, assumption of the positioning angle θ of the attachment member 60 in a design stage will be described with reference to FIGS. 1 and 12.

In the design stage, in the attachment member 60, the vehicle bodies 1 of various car models are assumed in advance as an attachment target of the vehicle-mounted camera 100. In the design stage, in the attachment member 60, a plurality of inclination angles ΨF are assumed in advance as inclination angles of the glass surface 51 of the front window 50 of the vehicle body 1 defined as the attachment target of the vehicle-mounted camera 100. The plurality of inclination angles ΨF are preferably, for example, inclination angles ΨF in a predetermined angle range (as an example, about 18° to about 30°).

As shown in FIG. 12, in the width-direction projecting portion (the seat) 33a of the attachment protrusion 33 of the cover housing 3a, the seat surface 33e that is mounted on the mounting surface 64a of the attachment member 60 is provided. The seat surface 33e extends along a positioning direction D33. The seat surface 33e is a surface fixed to the glass surface 51 via the attachment member 60. The seat surface 33e is preferably formed by cutting, for example. The positioning direction D33 can be variously selected during the cutting. Therefore, the width-direction projecting portion 33a includes the seat surface 33e having one positioning direction D33 selected from a plurality of positioning directions D33 (D33A, D33B, and D33C) different from one another. The positioning directions D33 (D33A, D33B, and D33C) form positioning angles θ (θA, θB, and θC) with respect to the direction of the optical axis L of the vehicle-mounted camera 100.

As shown in FIG. 12, in the design stage, in the width-direction projecting portion 33a of the cover housing 3a, a plurality of positioning directions D33A, D33B, D33C . . . smaller in number than the plurality of inclination angles ΨF are assumed in advance. The plurality of positioning directions D33A, D33B, D33C . . . assumed in advance correspond to the inclination angles ΨF in the predetermined angle range. As an example, the plurality of positioning directions D33A, D33B, D33C . . . are assumed at an interval of 3°. Therefore, when an angle range of the inclination angle ΨF of the front window 50 is about 18° to about 30° (width of about 22°), for example, four positioning directions D33A, D33B, D33C . . . are assumed.

Selection of the positioning direction D33 in an attachment stage of the vehicle-mounted camera 100 will be described.

When attachment of the vehicle-mounted camera 100 is performed, the inclination angle ΨF of the glass surface 51 of the front window 50 of the vehicle body 1, to which the vehicle-mounted camera 100 is attached, is specified. The inclination angle ΨF can be specified by measuring the inclination angle ΨF of the attachment target vehicle body 1. As the inclination angle ΨF, the inclination angle ΨF of the target vehicle body 1 may be specified from a database of inclination angles for each of car models.

Subsequently, on the basis of the specified inclination angle ΨF of the glass surface 51 of the vehicle body 1, at least one positioning direction D33 is selected from the positioning directions D33A, D33B, D33C . . . assumed in advance. A method of selecting the positioning angle D33 will be described in detail below.

Subsequently, the cover housing 3a having the selected positioning direction D33 is prepared. A step of preparing the cover housing 3a having the selected positioning direction D33 may be a step of manufacturing the cover housing 3a or may be a step of ordering the already manufactured cover housing 3a by, for example, purchasing the cover housing 3a. The step of preparing the cover housing 3a having the selected positioning direction D33 may be a step of preparing only one kind of cover housing 3a having the selected positioning direction D33 or may be a step of preparing in advance a plurality of cover housings 3a respectively having the plurality of positioning directions D33A, D33B, and D33C. In the case of the latter, the cover housing 3a to be actually used is selected during assembly.

Note that the step of manufacturing the cover housing 3a includes a step of cutting the seat surface 33e corresponding to the selected positioning direction D33.

A plurality of positioning directions D33 may be selected on the basis of the specified inclination angle ΨF of the glass surface 51 of the vehicle body 1. For example, in some case, a plurality of positioning directions D33A and D33B can be selected with respect to the inclination angle ΨF. As shown in FIG. 1, the direction of the optical axis L of the camera main assembly 2 only has to fit within the tolerable direction range LR. Therefore, the plurality of positioning directions D33A and D33B can be selected if the optical axis L is in a range fit within the tolerable direction range LR. In this case, the plurality of positioning directions D33A and D33B are selected and the cover housings 3a respectively having any one of the selected plurality of positioning directions D33A and D33B can be prepared. Further, one kind of cover housing 3a is selected from the prepared plurality of kinds of cover housings 3a. This selection can be performed on the basis of, for example, easiness of securing of the visual field of the camera main assembly 2.

Subsequently, as shown in FIGS. 2 to 4, the camera main assembly 2 is fixed to the inner side of the selected cover housing 3a. Further, the processing board 5 and the base housing 3b are fixed to the cover housing 3a. Consequently, the assembly of the vehicle-mounted camera 100 is completed.

Subsequently, as shown in FIG. 12, the attachment member 60 is fixed to the glass surface 51 of the front window 50. Further, the vehicle-mounted camera 100 including the cover housing 3a attached with the camera main assembly 2 is attached to the attachment member 60. Consequently, it is possible to fix the vehicle-mounted camera 100 to the glass surface 51 of the vehicle body 1 via the attachment member 60. Note that the attachment member 60 may be fixed to the glass surface 51 after the vehicle-mounted camera 100 is attached to the attachment member 60.

The vehicle-mounted camera 100 is supported in contact with the mounting surface 64a of the attachment member 60 on the seat surface 33e of the cover housing 3a. The seat surface 33e inclines in the positioning direction D33 selected on the basis of the inclination angle ΨF of the glass surface 51. Therefore, the vehicle-mounted camera 100 is attached to incline with respect to the glass surface 51 in a direction corresponding to the positioning direction D33.

An attachment operator can attach the vehicle-mounted camera 100 to the vehicle body 1 according to various car models through the steps described above.

Subsequently, direction adjustment processing of the camera main assembly 2 of the vehicle-mounted camera 100 is performed. The direction adjustment processing performs calibration of the vehicle-mounted camera 100 by electronic processing.

As shown in FIG. 1, the optical axis L of the vehicle-mounted camera 100 is set within the tolerable direction range LR. Therefore, the optical axis L of the vehicle-mounted camera 100 sometimes has deviation with respect to a most preferred optical axis direction within the tolerable direction range LR. In an assembly process of the vehicle-mounted camera 100, deviation sometimes occurs with respect to the optical axis L in terms of a design value because of an assembly error. The vehicle-mounted camera 100 in this preferred embodiment can calibrate the deviation with respect to the most preferable optical axis direction with electronic processing by performing the direction adjustment processing. In the direction adjustment processing, attachment direction detection processing and direction calculation processing described below are executed.

The processing circuit 4 mounted on the processing board 5 of the vehicle-mounted camera 100 preferably executes at least attachment direction detection processing and direction calculation processing by electronically processing an image captured by the camera main assembly 2.

Attachment direction detection processing executed by the processing circuit 4 will be described.

In the attachment direction detection processing, first, in a state in which the vehicle-mounted camera 100 is attached to the glass surface 51 via the attachment member 60, the camera main assembly 2 captures an image of a target object used in direction detection located in a known direction when viewed from the vehicle body 1. Consequently, the processing circuit 4 acquires a captured target object image of the target object used in direction detection. Further, the processing circuit 4 detects the position of the target object used in direction detection on the captured target object image. On the other hand, the processing circuit 4 causes, on the basis of the known direction, the driver to recognize an original position, which is a position where the target object used in direction detection should be originally present on the image. The processing circuit element 4 calculates an attachment direction deviation using the original position and the position on the image and records the attachment direction deviation. That is, the processing circuit 4 calculates an attachment direction deviation of the camera main assembly 2 using the known direction and the position of the target object used in direction detection and stores the attachment direction deviation.

Direction calculation processing executed by the processing circuit 4 will now be described.

In the direction calculation processing, the processing circuit 4 calculates, using the attachment direction deviation calculated by the attachment direction detection processing, from a position on an image of an object captured by the camera main assembly 2, an original direction in which the object is located when viewed from the vehicle body. In the direction calculation processing, the processing circuit 4 may calculate an original direction on the basis of the known direction and the position of the target object used in direction detection acquired during the calculation of the attachment direction deviation described above. The processing circuit 4 is able to reduce a direction error of the vehicle-mounted camera by executing the direction calculation processing.

Note that the attachment direction detection processing and the direction calculation processing performed by the electronic processing in the processing circuit 4 of the vehicle-mounted camera 100 are described above. Besides, the attachment direction detection processing and the direction calculation processing may be performed according to an image processing program of an external apparatus connected to the vehicle-mounted camera 100.

A method of selecting one positioning direction D33A (for example, direction D33A or D33B) from the plurality of positioning directions D33A, D33B, D33C . . . will now be described.

Figure 13:
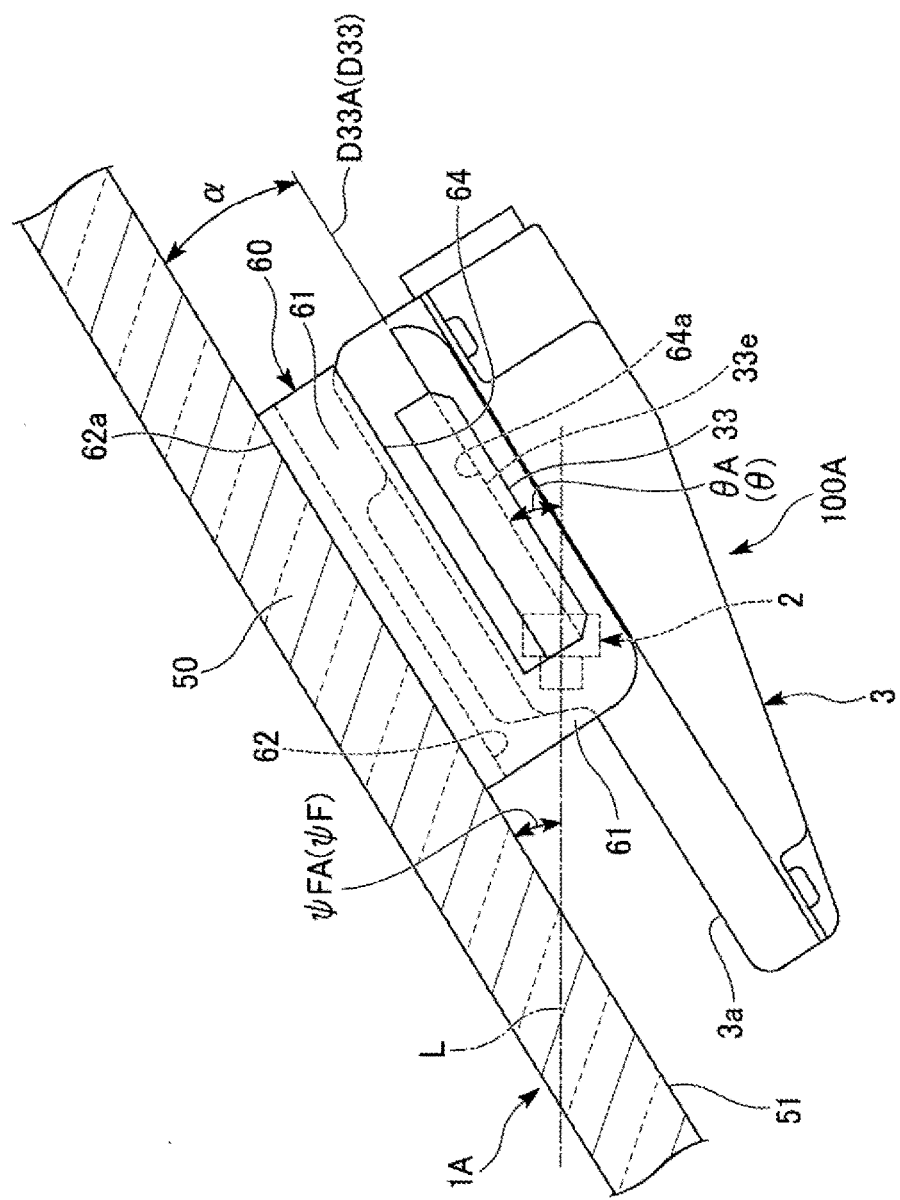
FIG. 13 is a side view of the vehicle-mounted camera and the attachment member according to a preferred embodiment of the present invention and shows a state in which the vehicle-mounted camera is attached to a front window.
Figure 14:
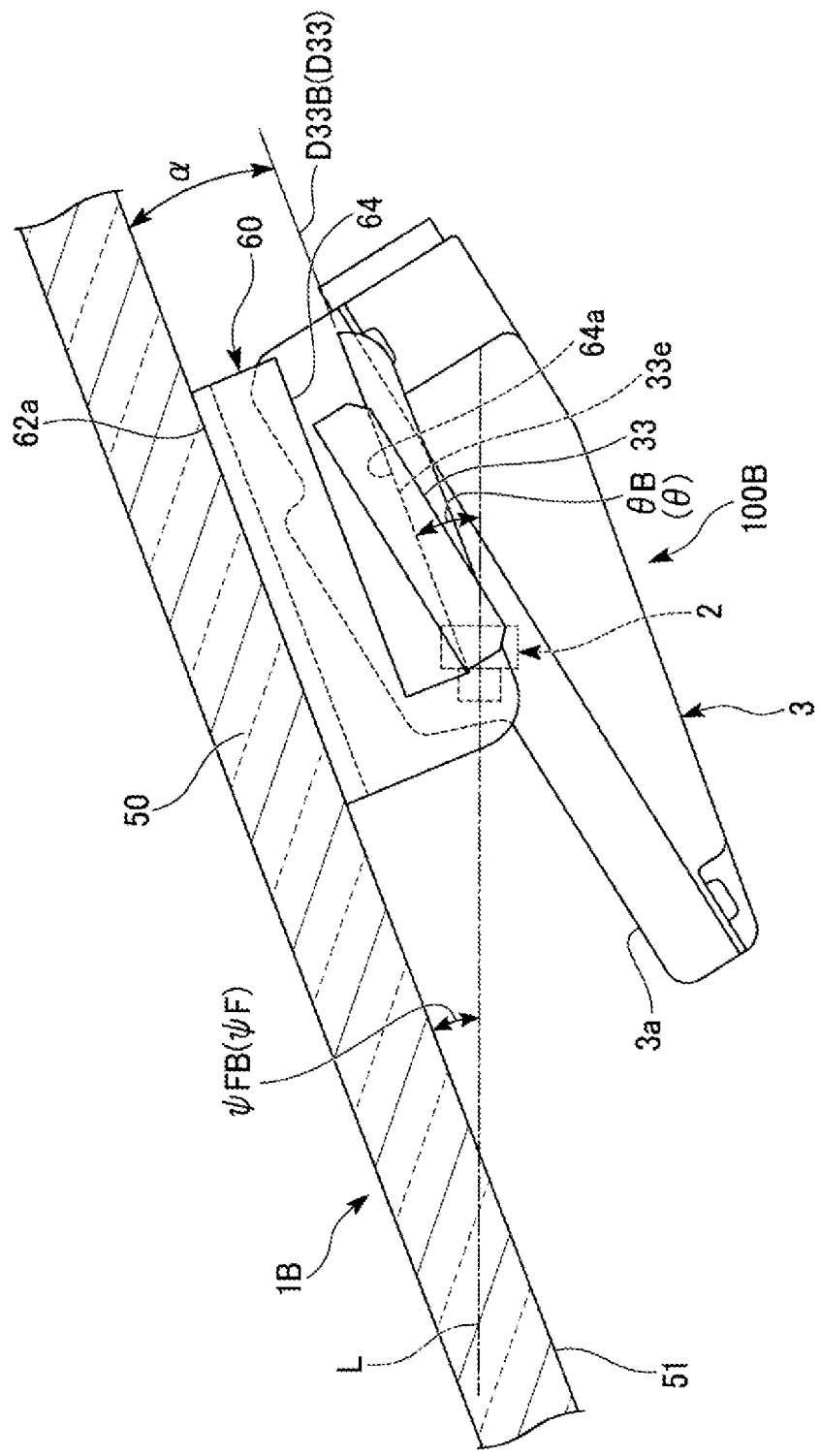
FIG. 14 is a side view of a vehicle-mounted camera and the attachment member according to a preferred embodiment of the present invention and shows a state in which the vehicle-mounted camera is attached to the front window.

FIG. 13 is a side view showing a state in which a vehicle-mounted camera 100A including the cover housing 3a having the positioning direction D33A is preferably attached to a vehicle body 1B. The front window 50 of the vehicle body 1A has an inclination angle ΨFA. FIG. 14 is a side view showing a state in which a vehicle-mounted camera 100B including the cover housing 3a having the positioning direction D33B is attached to a vehicle body 1B. The front window 50 of the vehicle body 1B has an inclination angle ΨFB. Note that, in FIGS. 13 and 14, illustration of the leaf springs 66 and the concave portions 64c (see FIG. 10) provided in the attachment openings 64 of the attachment members 60 is omitted.

In the vehicle body 1A and the vehicle body 1B, the inclination angles ΨFA and ΨFB of the front window 50 have a relation of ΨFA>ΨFB. The positioning angle θA defined by the positioning direction D33A and the optical axis L and the positioning angle θB formed by the positioning direction D33B and the optical axis L have a relation of θB>θA.

Note that FIGS. 13 and 14 are side views schematically showing the front window 50, the attachment members 60, and the vehicle-mounted camera 100 to clearly show a fixing relation thereof. The members illustrated may have different structures than actual members used in the vehicle.

In the following explanation, the vehicle bodies 1A and 1B are described as the vehicle body 1 in common, the positioning directions D33A and D33B are described as the positioning direction D33 in common, and the positioning angles θA and θB are described as the positioning angle θ in common.

In this preferred embodiment of the present invention, the optical axis L is set in the horizontal direction. Therefore, the inclination angle ΨF, which is an angle of depression of the glass surface 51 with respect to the horizontal surface is equal to an angle defined by the glass surface 51 and the optical axis L.

Note that, in this specification, the direction (the positioning direction D33) means a tilting direction in a plane including the front-back direction and the perpendicular direction (the vertical direction). Similarly, the inclination angle ΨF, the positioning angle θ, and a difference α described below are angles formed by the directions within the plane including the front-back direction and the perpendicular direction (the vertical direction).

As shown in FIGS. 13 and 14, the mounting surface 64a of the attachment member 60 is disposed at an angle difference of the difference α with respect to the glass surface 51. The difference α is an angle determined according to a positional relation between the upper surface 62a and the mounting surface 64a of the attachment member 60. Therefore, the difference α remains unchanged no matter what type of vehicle the vehicle-mounted camera 100 is attached to, as long as the configuration of the vehicle-mounted camera 100 is not changed.

As shown in FIGS. 13 and 14, the positioning angle θ is a difference between the positioning direction D33, which is the direction of the seat surface 33e, and the direction of the optical axis L of the camera main assembly 2.

The inclination angle ΨF, the positioning angle θ, and the difference α have a relation of the following Expression 1 calculated as a sum of interior angles of a triangle:

$$\Psi F = \theta - \alpha \quad \text{Expression 1}$$

Note that, in Expression 1, the difference α and the positioning angle θ have positive and negative angles. The difference α is an angle in the direction of the glass surface 51 with respect to the direction of the mounting surface 64a. In FIGS. 13 and 14, an angle in a left rotation direction is defined as a positive angle. On the other hand, the positioning angle θ is an angle of the direction of the optical axis L with respect to the seat surface 33e. In FIGS. 13 and 14, an angle in a right rotation direction is defined as a positive angle.

Expression 1 can be transformed into the following Expression 2

$$\theta = \Psi F + \alpha \quad \text{Expression 2}$$

The difference α is an angle depending on the configuration of each component of the attachment member 60 and is a constant in this preferred embodiment of the present invention. On the other hand, the positioning angle θ can be changed by selecting the positioning direction D33 of the seat surface 33e. That is, the operator who attaches the vehicle-mounted camera 100 to the vehicle body 1 can direct the optical axis L to a preferable direction by appropriately selecting the positioning direction D33 on the basis of Expression 2. The operator selects the preferable positioning direction D33 calculated on the basis of Expression 2 and cuts the cover housing 3a. Consequently, it is possible to attach the vehicle-mounted camera 100 to the vehicle body 1 with the optical axis L set within the tolerable direction range LR (see FIG. 1).

As described above, the positioning direction D33 (D33A, D33B) is selected by a predetermined method of referring to the inclination angle ΨF (ΨFA, ΨFB) of the vehicle body 1 (1A, 1B) specified by a car model and the difference α between the direction of the glass surface and the direction of the mounting surface 64a (i.e., the direction of the seat surface 33e), and the direction of the optical axis L of the camera main assembly 2.

Note that, as the "predetermined method" of selecting the positioning direction D33, the method of selecting the preferable positioning direction D33 on the basis of Expression 2 is described as an example above. However, other alternative methods may be used if so desired. For example, the inclination angles ΨF of the glass surface 51 and types of the cover housing 3a having the positioning directions D33 selectable with respect to the inclination angles ΨF may be prepared as a selection table on the basis of Expression 2 in advance. In this case, selecting the positioning direction D33 with reference to the table corresponds to the "predetermined method". When the inclination angle ΨF of the glass surface 51 for each of car models is specified, the car models and types of the cover housing 3a having the positioning direction D33 selectable with respect to the car models may be prepared as a selection table.

As described above, according to this preferred embodiment of the present invention, it is possible to provide a method of manufacturing a vehicle having a vehicle-mounted camera that is low in costs and has an optical axis L with an angle that is easy to adjustment.

A method of manufacturing a vehicle according to Variation 1 of a preferred embodiment of the present invention will now be described.

Figure 15:
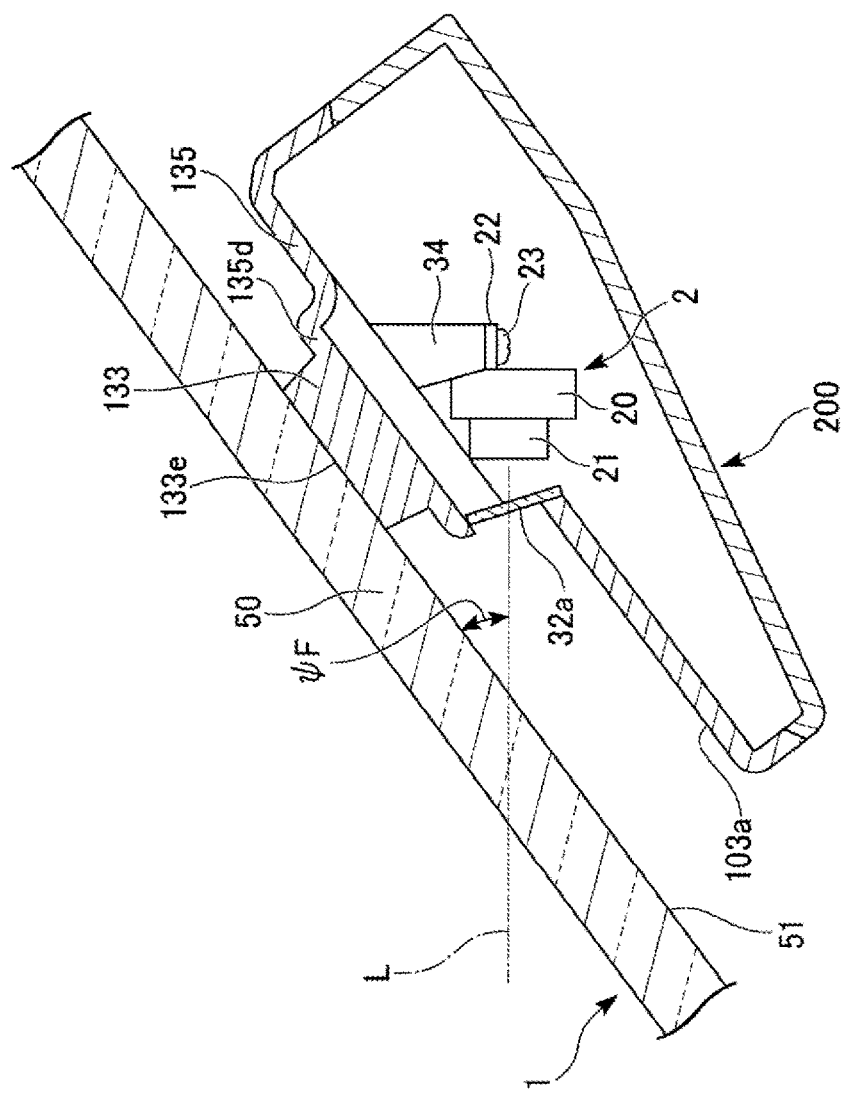
FIG. 15 is a sectional view of a vehicle-mounted camera according to Variation 1 of a preferred embodiment of the present invention and shows a state in which the vehicle-mounted camera is attached to the front window.

FIG. 15 is a sectional view of a vehicle-mounted camera 200 related to the method of manufacturing the vehicle according to Variation 1 of a preferred embodiment of the present invention. Note that components same as the components in the preferred embodiment described above are denoted by the same reference numerals and signs and explanation of the components is omitted.

As shown in FIG. 15, the vehicle-mounted camera 200 includes a cover housing 103a. The camera main assembly 2 is attached to the cover housing 103a. The cover housing 103a includes a tabular top plate 135 facing the upper side. As in the preferred embodiment described above, a camera housing portion 135d projecting to the upper side is provided in the top plate 135. The camera main assembly 2 is accommodated in a space in a lower portion of the camera housing portion 135d. The top plate 135 preferably includes a seat 133 projecting to the upper side from the upper surface of the camera housing portion 135d. The seat 133 includes a seat surface 133e facing the upper side. The seat surface 133e is a surface fixed to the glass surface 51.

The cover housing 103a is preferably manufactured through, for example, at least a molding process and a machining process. More specifically, the cover housing 103a can be manufactured by applying cutting (machining) to an intermediate member molded by a molding process using a die to form the seat surface 133e.

Examples of the molding process include resin molding or aluminum die cast targeting an aluminum alloy.

In the machining, the seat surface 133e, which is a surface along a predetermined direction selected according to the inclination angle ΨF of the glass surface 51, is preferably formed by, for example, a machining tool such as an end mill.

A selection method for the direction of the seat surface 133e is preferably the same as the selection method according to the preferred embodiment described above. That is, the predetermined direction is determined with reference to the inclination angle ΨF of the glass surface 51 of the target vehicle body 1, a difference between a direction of the glass surface 51 and a direction of the seat surface 133e, and a direction of the optical axis L of the camera main assembly 2. Note that, in this variation, since the seat surface 133e is directly fixed to the glass surface 51, there is no difference between the direction of the glass surface 51 and the direction of the seat surface 133e. Therefore, the predetermined direction is determined with reference to the inclination angle ΨF of the glass surface 51 of the target vehicle body 1 and the direction of the optical axis L of the camera main assembly 2.

According to this variation, as in the above-described preferred embodiments of the present invention, it is possible to provide a method of manufacturing a vehicle having a vehicle-mounted camera that is low in costs and has an optical axis L with an angle which can be adjusted easily.

The preferred embodiments of the present invention and variations thereof are described above. However, the components, the combinations of the components, and the like in the preferred embodiments and the variations are examples. Addition, omission, replacement, and other changes of components are possible within a range not departing from the spirit of the present invention. The present invention is not limited by the above described preferred embodiments and variations.

For example, in the preferred embodiments and the variations, the machining of the seat surface 33e is described as being performed before the assembly of the vehicle-mounted camera 100. However, the machining may be performed after the assembly.

In the preferred embodiments and the variations, the example is described in which the housing 3 preferably includes the cover housing 3a and the base housing 3b. However, the housing 3 may include only the cover housing 3a. In this case, the cover housing 3a may cover the lower side of the processing board 5. In the preferred embodiments and the variations, the example is described in which the width-direction projecting portion 33a functioning as the seat is located in the width-direction side portion of the cover housing 3a. However, the width-direction projecting portion 33a may be located on the upper side of the cover housing 3a.

In the preferred embodiments and the variations, the shape of the top plate is simply described as the tabular shape. However, the shape of the top plate is not limited to the simple tabular shape. For example, the shape of the top plate may be a curved tabular shape or may be a shape having a step on the surface or thickness of which partially changes. If members have transverse dimensions exceeding ten times of the thicknesses of the members, all of the members are referred to as tabular in the preferred embodiments of the present invention irrespective of what kinds of shapes details of the members have.

In the preferred embodiments and the variations, the cover housing 3a and the base housing 3b are preferably made of aluminum or an aluminum alloy. However, the cover housing and the base housing may be made of other metal materials or resin materials. Similarly, the attachment member 60 may be made of metal materials or resin materials other than steel.

In addition to the camera main assembly 2, other vehicle-mounted devices such as, for example, a rain sensor, a millimeter wave radar sensor, and a laser radar sensor may be mounted on the vehicle-mounted cameras 100 according to the preferred embodiments and the variations.

A configuration can also be adopted in which the lens assembly 21 of the camera main assembly 2 reaches the outer side from the viewing window 32 of the cover housing 3a.

While preferred embodiments of the present invention and variations thereof have been described above, it is to be understood that variations and modifications will be apparent to those skilled in the art without departing from the scope and spirit of the present invention. The scope of the present invention, therefore, is to be determined solely by the following claims.

What is claimed is:

1. A method of manufacturing a vehicle including a vehicle-mounted camera including a cover housing including a tabular top plate and a camera main assembly, the vehicle-mounted camera being attached to a glass surface on a vehicle interior side of a window glass in a posture in which the top plate extends along the window glass facing forward or rearward of a vehicle body, and capable of capturing an image of a scene of a vehicle exterior, the method comprising:

preparing a set of dies including a pair of or three or more partial dies that obtain, when combined, an internal cavity including a tabular portion sandwiched by a pair of internal surfaces;

injecting a material in a flow state into the internal cavity in a state in which the partial dies are combined;

solidifying the material;

separating the partial dies in the combined state and extracting an intermediate member;

applying machining to the intermediate member to obtain the cover housing;

fixing the camera main assembly to an inner side of the cover housing;

preparing the vehicle body;

attaching the cover housing attached with the camera main assembly to the window glass; and performing direction adjustment processing for the camera main assembly; wherein the camera main assembly includes a lens assembly, the cover housing includes a seat;

a pair of inner surfaces of the die sandwiching the tabular portion in the internal cavity are respectively surfaces of the different partial dies;

one of the pair of inner surfaces includes a first surface and the other includes a second surface opposed to the first surface in a vertical direction;

the intermediate member includes an intermediate seat portion made of the material solidified between the first surface and the second surface;

a distance in the vertical direction between the first surface and the second surface is larger than a vertical dimension of the seat;

in the machining, at least a portion of the intermediate seat portion is cut to form the seat;

when the seat is formed in the machining, a seat surface that is a surface along a predetermined direction and to be fixed to the glass surface is formed;

the predetermined direction is determined with reference to an inclination angle of the glass surface of the vehicle body, a difference between a direction of the glass surface and a direction of the seat surface, and a direction of an optical axis of the camera main assembly;

the vehicle-mounted camera includes:

a board connected to the camera main assembly and accommodated in the cover housing; and a processing circuit mounted on the board and capable of executing, by electronically processing an image captured by the camera main assembly, at least attachment direction detection processing and direction calculation processing;

in the direction adjustment processing, the attachment direction detection processing and the direction calculation processing are executed;

in the attachment direction detection processing:

in a state in which the vehicle-mounted camera is attached to the glass surface, a target object image of a target object used in direction detection located in a known direction when viewed from the vehicle body is acquired through image-capturing by the camera main assembly;

a position of the target object used in direction detection on the target object image is detected;

an attachment direction deviation of the camera main assembly calculated using the known direction and the position of the target object used in direction detection is retained in the processing circuit; and in the direction calculation processing, from a position on an image of an object captured by the camera main assembly, a direction in which the object is located when viewed from the vehicle body is calculated using both of the known direction and the position of the target object used in the direction detection or the attachment direction deviation.

2. The method of manufacturing the vehicle according to claim 1, wherein the predetermined direction is determined further with reference to an image-capturing direction in which the camera main assembly captures an image of a scene and a tolerance allowed in the image-capturing direction.

3. The method of manufacturing the vehicle according to claim 1, further comprising a surface treatment process of forming a surface film in at least a portion of a surface of the intermediate member.

4. The method of manufacturing the vehicle according to claim 2, further comprising a surface treatment process of forming a surface film in at least a portion of a surface of the intermediate member.

5. The method of manufacturing the vehicle according to claim 3, wherein the machining is carried out after the surface treatment process.

6. The method of manufacturing the vehicle according to claim 4, wherein the machining is carried out after the surface treatment process.

7. The method of manufacturing the vehicle according to claim 1, wherein
a first angle formed by, of side surfaces of the seat, a rearward side surface on an opposite side of an image-capturing direction of the camera main assembly and the top plate is smaller than 90°; and
a second angle defined by, of the side surfaces of the seat, a forward side surface on the image-capturing direction side of the camera main assembly and the top plate is smaller than 90°.

8. The method of manufacturing the vehicle according to claim 2, wherein
a first angle formed by, of side surfaces of the seat, a rearward side surface on an opposite side of an image-capturing direction of the camera main assembly and the top plate is smaller than 90°; and
a second angle formed by, of the side surfaces of the seat, a forward side surface on the image-capturing direction side of the camera main assembly and the top plate is smaller than 90°.

9. The method of manufacturing the vehicle according to claim 3, wherein
a first angle formed by, of side surfaces of the seat, a rearward side surface on an opposite side of an image-capturing direction of the camera main assembly and the top plate is smaller than 90°; and
a second angle formed by, of the side surfaces of the seat, a forward side surface on the image-capturing direction side of the camera main assembly and the top plate is smaller than 90°.

10. The method of manufacturing the vehicle according to claim 4, wherein
a first angle formed by, of side surfaces of the seat, a rearward side surface on an opposite side of an image-capturing direction of the camera main assembly and the top plate is smaller than 90°; and
a second angle formed by, of the side surfaces of the seat, a forward side surface on the image-capturing direction side of the camera main assembly and the top plate is smaller than 90°.

11. The method of manufacturing the vehicle according to claim 5, wherein
a first angle formed by, of side surfaces of the seat, a rearward side surface on an opposite side of an image-capturing direction of the camera main assembly and the top plate is smaller than 90°; and
a second angle formed by, of the side surfaces of the seat, a forward side surface on the image-capturing direction side of the camera main assembly and the top plate is smaller than 90°.

12. The method of manufacturing the vehicle according to claim 6, wherein
a first angle formed by, of side surfaces of the seat, a rearward side surface on an opposite side of an image-capturing direction of the camera main assembly and the top plate is smaller than 90°; and
a second angle formed by, of the side surfaces of the seat, a forward side surface on the image-capturing direction side of the camera main assembly and the top plate is smaller than 90°.

13. The method of manufacturing the vehicle according to claim 1, wherein the seat surface and the glass surface are fixed by an adhesive.

14. The method of manufacturing the vehicle according to claim 2, wherein the seat surface and the glass surface are fixed by an adhesive.

15. The method of manufacturing the vehicle according to claim 3, wherein the seat surface and the glass surface are fixed by an adhesive.

16. The method of manufacturing the vehicle according to claim 4, wherein the seat surface and the glass surface are fixed by an adhesive.

17. The method of manufacturing the vehicle according to claim 5, wherein the seat surface and the glass surface are fixed by an adhesive.

18. The method of manufacturing the vehicle according to claim 6, wherein the seat surface and the glass surface are fixed by an adhesive.

19. The method of manufacturing the vehicle according to claim 10, wherein the seat surface and the glass surface are fixed by an adhesive.

20. The method of manufacturing the vehicle according to claim 11, wherein the seat surface and the glass surface are fixed by an adhesive.

21. The method of manufacturing the vehicle according to claim 12, wherein the seat surface and the glass surface are fixed by an adhesive.

22. The method of manufacturing the vehicle according to claim 1, wherein
the cover housing is attached to the window glass via an attachment member fixed to the glass surface; and
the attachment member includes an attachment surface that contacts and is fixed to the seat surface of the cover housing.

23. The method of manufacturing the vehicle according to claim 2, wherein the cover housing is attached to the window glass via an attachment member fixed to the glass surface; and the attachment member includes an attachment surface that contacts and is fixed to the seat surface of the cover housing.

24. The method of manufacturing the vehicle according to claim 3, wherein
the cover housing is attached to the window glass via an attachment member fixed to the glass surface; and
the attachment member includes an attachment surface that contacts and is fixed to the seat surface of the cover housing.

25. The method of manufacturing the vehicle according to claim 4, wherein
the cover housing is attached to the window glass via an attachment member fixed to the glass surface; and
the attachment member includes an attachment surface that contacts and is fixed to the seat surface of the cover housing.

26. The method of manufacturing the vehicle according to claim 5, wherein
the cover housing is attached to the window glass via an attachment member fixed to the glass surface; and
the attachment member includes an attachment surface that contacts and is fixed to the seat surface of the cover housing.

27. The method of manufacturing the vehicle according to claim 6, wherein
the cover housing is attached to the window glass via an attachment member fixed to the glass surface; and
the attachment member includes an attachment surface that contacts and is fixed to the seat surface of the cover housing.

28. The method of manufacturing the vehicle according to claim 10, wherein
the cover housing is attached to the window glass via an attachment member fixed to the glass surface; and
the attachment member includes an attachment surface that contacts and is fixed to the seat surface of the cover housing.

29. The method of manufacturing the vehicle according to claim 11, wherein
the cover housing is attached to the window glass via an attachment member fixed to the glass surface; and
the attachment member includes an attachment surface that contacts and is fixed to the seat surface of the cover housing.

30. The method of manufacturing the vehicle according to claim 12, wherein
the cover housing is attached to the window glass via an attachment member fixed to the glass surface; and
the attachment member includes an attachment surface that contacts and is fixed to the seat surface of the cover housing.

31. The method of manufacturing the vehicle according to claim 13, wherein
the cover housing is attached to the window glass via an attachment member fixed to the glass surface; and
the attachment member includes an attachment surface that contacts and is fixed to the seat surface of the cover housing.

32. The method of manufacturing the vehicle according to claim 14, wherein
the cover housing is attached to the window glass via an attachment member fixed to the glass surface; and
the attachment member includes an attachment surface that contacts and is fixed to the seat surface of the cover housing.

33. The method of manufacturing the vehicle according to claim 15, wherein
the cover housing is attached to the window glass via an attachment member fixed to the glass surface; and
the attachment member includes an attachment surface that contacts and is fixed to the seat surface of the cover housing.

34. The method of manufacturing the vehicle according to claim 16, wherein
the cover housing is attached to the window glass via an attachment member fixed to the glass surface; and
the attachment member includes an attachment surface that contacts and is fixed to the seat surface of the cover housing.

35. The method of manufacturing the vehicle according to claim 17, wherein
the cover housing is attached to the window glass via an attachment member fixed to the glass surface; and
the attachment member includes an attachment surface that contacts and is fixed to the seat surface of the cover housing.

36. The method of manufacturing the vehicle according to claim 18, wherein
the cover housing is attached to the window glass via an attachment member fixed to the glass surface; and
the attachment member includes an attachment surface that contacts and is fixed to the seat surface of the cover housing.

37. The method of manufacturing the vehicle according to claim 19, wherein
the cover housing is attached to the window glass via an attachment member fixed to the glass surface; and
the attachment member includes an attachment surface that contacts and is fixed to the seat surface of the cover housing.

38. The method of manufacturing the vehicle according to claim 20, wherein
the cover housing is attached to the window glass via an attachment member fixed to the glass surface; and
the attachment member includes an attachment surface that contacts and is fixed to the seat surface of the cover housing.

39. The method of manufacturing the vehicle according to claim 21, wherein
the cover housing is attached to the window glass via an attachment member fixed to the glass surface; and
the attachment member includes an attachment surface that contacts and is fixed to the seat surface of the cover housing.

* * * * *